May 13, 1924.

F. HONNELL

FOLDING BED

Filed Jan. 29, 1923

Frank Honnell
INVENTOR

BY Victor J. Evans
ATTORNEY

WITNESS:

May 13, 1924.
F. HONNELL
FOLDING BED
Filed Jan. 29, 1923
1,493,673
2 Sheets-Sheet 2
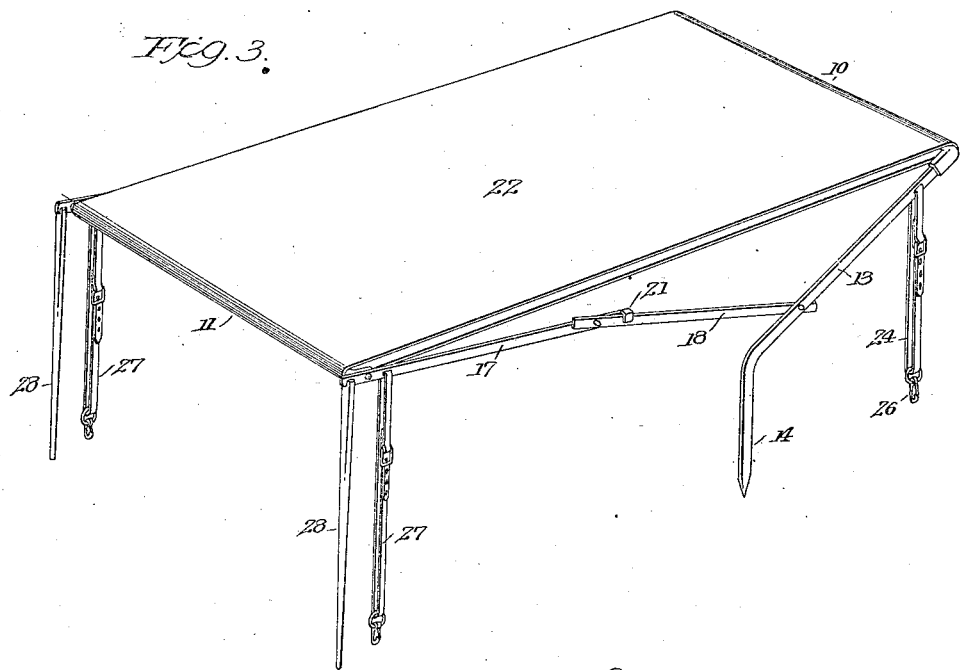
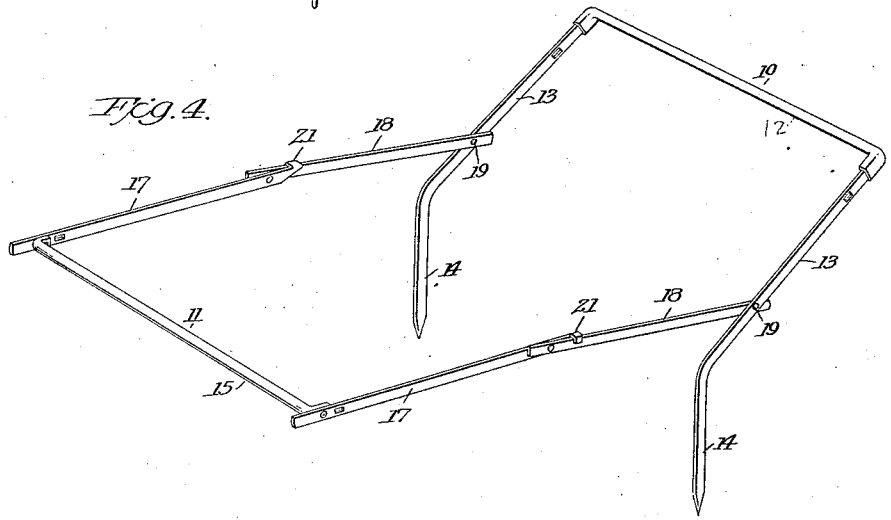
Frank Honnell, INVENTOR Patented May 13, 1924.

1,493,673

UNITED STATES PATENT OFFICE.

FRANK HONNELL, OF EVEREST, KANSAS.

FOLDING BED.

Application filed January 29, 1923. Serial No. 615,699.

*To all whom it may concern:*

Be it known that I, FRANK HONNELL, a citizen of the United States, residing at Everest, in the county of Brown and State of Kansas, have invented new and useful Improvements in Folding Beds, of which the following is a specification.

This invention relates to improvements in folding or collapsible beds especially adapted for use within automobiles.

An object of the present invention is the provision of a bed of this character which is light, strong and durable, may be readily set up to provide a convenient and comfortable bed and may be easily and quickly removed and collapsed, or may be folded within the rear of the automobile to leave the front seat free, without entirely removing the bed from its position.

With the above and other objects in view, the invention further includes the following novel features and details of construction, to be hereinafter more fully described, illustrated in the accompanying drawings, and pointed out in the appended claims.

In the drawings:—

Figure 3 is a perspective view of the bed removed from the automobile and shown extended.

Figure 4 is a similar view of the frame.

Figure 1:
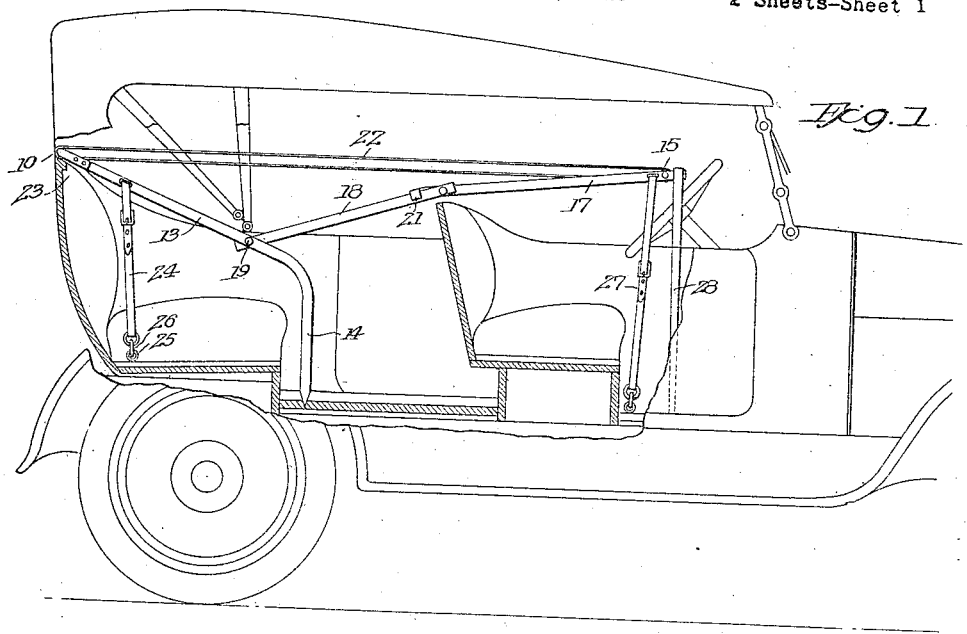
Figure 1 is a side elevation of an automobile partly broken away showing the bed set up for use.

Referring in detail to the drawings, wherein like characters of reference denote corresponding parts, the improved bed is shown as comprising a frame which includes a pair of substantially U-shaped members 10 and 11.

The member 10 comprises a cross bar 12 which is preferably formed of a length of pipe having its ends bend substantially at right angles and flattened for connection with the inner ends of flat metallic side bars 13, whose outer ends are bent to provide supporting legs 14. Any suitable means may be employed for connecting the ends of the side bars 13 to the ends of the cross bar 12.

The U-shaped member 11 is preferably formed of a length of pipe 15, to each end of which is secured as at 16, the inner ends of side bars 17, the latter being preferably formed of flat metal. Pivotally connected to the inner ends of the side bars 17 are the inner ends of links 18, whose opposite ends are pivotally connected to the side bars 13 of the members 10, as shown at 19. Downward pivotal movement of the side bars 17 and the links 18 is limited by stops 21.

The ends 12 and 15 of the frame are preferably connected by a canvas or other suitable fabric cover 22 herein shown as of endless formation so as to receive the cross bars at each end of the frame.

The bed thus described is adapted to be placed within an automobile with the cross bar 12 of the rear U-shaped member 10 resting upon the back 23 of the rear seat with the legs 14 resting upon the floor of the automobile. The legs 14 are of such length that when the frame is in this position, the forward end of the bed will extend over and be spaced above the back of the front seat as shown in the drawings and in order to prevent downward tilting movement of this front end, there is provided straps 24. These straps have one of their ends secured to the side bars 13 of the rear U-shaped member 10 at points spaced from the rear end of said member and their opposite ends detachably engaging eyes or rings 25 positioned at the base of the back of the rear seat of the automobile, snap hooks or other suitable devices 26 being provided for this purpose. The forward end of the bed is provided with adjustable straps 27, which are connected to front supporting legs 28 and when the straps 27 are tightened, the forward end of the bed will be securely held in place.

Figure 2:
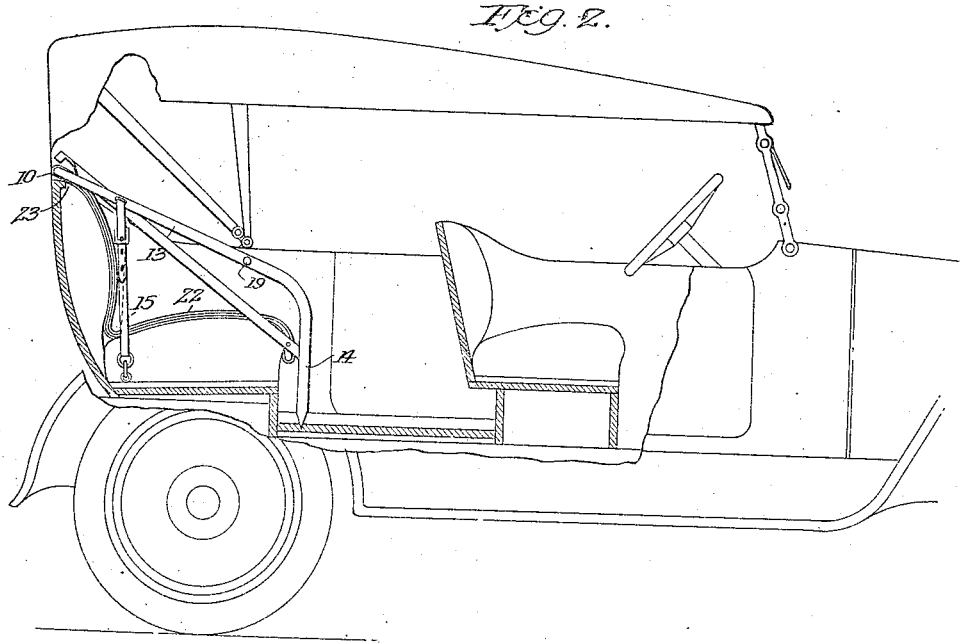
Figure 2 is a similar view with the bed folded.

By reference to the drawings it will be seen that when the bed is set up in the position shown in Figure 1, it will provide a yieldingly comfortable bed which may be quickly and easily positioned for use, the supporting means being such that baggage or other objects may be stored beneath the bed when the latter is occupied. By detaching the straps 27, the bed may be folded over the rear seat of the vehicle as shown in Figure 2, the end bar 15 occupying a position immediately in front of the rear seat, so that this seat may be comfortably used without entirely removing the bed from its position, while the front seat will be entirely free for occupancy. When it is again desired to use the bed it is only necessary to extend the same and secure the forward straps in position. The bed is therefore especially adapted for the comfort and convenience of two persons touring in an automobile.

The invention is susceptible of various changes in its form, proportions and minor details of construction and the right is herein reserved to make such changes as properly fall within the scope of the appended claims.

Having described the invention what is claimed is:—

1. In a bed adapted for use in automobiles a frame including a pair of substantially U-shaped members, links having their opposite ends pivotally connected to the ends of said members to provide a rectangular frame, a fabric cover having its opposite ends connected to the opposite ends of said frame, means for limiting the relative movement of the links and one of the U-shaped members in one direction, legs extending from said frame and adapted to rest upon the floor of the automobile with the rear end of said frame resting upon the back of the rear seat and the forward end of the frame spaced above the front seat, detachable means connecting the rear end of the frame with the body of the automobile to resist downward movement of said forward end and flexible means connecting the forward end of the frame to the floor of the automobile.

2. In a bed adapted for use on automobiles a frame including a pair of substantially U-shaped members, links having their opposite ends pivotally connected to the ends of said members to provide a rectangular frame, a fabric cover having its opposite ends connected to the opposite ends of said frame, means for limiting the relative movement of the links and one of the U-shaped members in one direction, legs extending from said frame and adapted to rest upon the floor of the automobile with the rear end of said frame resting upon the back of the rear seat and the forward end of the frame spaced above the front seat, straps having one of their ends secured to the sides of the rear U-shaped member between the legs and the rear end of said member and their opposite ends detachably secured to the body of the automobile to resist downward movement of the forward end of the frame and flexible means connecting the forward end of the frame to the floor of the automobile.

3. In a bed adapted for use in automobiles a frame including a pair of substantially U-shaped members, links having their opposite ends pivotally connected to the ends of said members to provide a rectangular frame, a fabric cover having its opposite ends connected to the opposite ends of said frame, means for limiting the relative movement of the links and one of the U-shaped members in one direction, legs included in and extending downwardly from the rear U-shaped member and adapted to rest upon the floor of the automobile with the rear end of said frame resting upon the back of the rear seat and the forward end of the frame spaced above the front seat, detachable means connecting the rear end of the frame with the body of the vehicle to resist downward movement of the forward end and flexible means connecting the forward end of the frame to the floor of the automobile.

4. In a bed adapted for use in automobiles, a frame including a pair of substantially U-shaped members, links having their opposite ends pivotally connected to the ends of said members to provide a rectangular frame, a fabric cover having its opposite ends connected to the opposite ends of the frame, means for limiting the relative movement of the links and one of the U-shaped members in one direction, means for removably securing one of the U-shaped members over the rear seat of the automobile with the opposite end of the frame extending over and beyond the front seat, flexible means connecting the forward end of the frame to the floor of the automobile and legs for supporting the forward end of the frame.

In testimony whereof I affix my signature.

FRANK HONNELL.